United States Patent
Fan et al.

(10) Patent No.: US 12,116,305 B2
(45) Date of Patent: Oct. 15, 2024

(54) ULTRATHIN GLASS CERAMIC ARTICLE AND METHOD FOR PRODUCING AN ULTRATHIN GLASS CERAMIC ARTICLE

(71) Applicant: SCHOTT Glass Technologies (Suzhou) Co. Ltd., Jiangsu (CN)

(72) Inventors: Huiyan Fan, Jiangsu (CN); Ning Da, Jiangsu (CN); Chong Wang, Jiangsu (CN); Jose Zimmer, Eppstein (DE)

(73) Assignee: SCHOTT GLASS TECHNOLOGIES (SUZHOU) CO. LTD., Jiangsu (CN)

( * ) Notice: Subject to any disclaimer, the term of this patent is extended or adjusted under 35 U.S.C. 154(b) by 565 days.

(21) Appl. No.: 17/226,898

(22) Filed: Apr. 9, 2021

(65) Prior Publication Data

US 2021/0230049 A1    Jul. 29, 2021

Related U.S. Application Data

(63) Continuation of application No. PCT/CN2018/109715, filed on Oct. 10, 2018.

(51) Int. Cl.
| | |
|---|---|
| B32B 15/04 | (2006.01) |
| B32B 17/06 | (2006.01) |
| C03C 10/00 | (2006.01) |
| C03C 21/00 | (2006.01) |

(52) U.S. Cl.
CPC ...... C03C 10/0045 (2013.01); C03C 10/0027 (2013.01); C03C 21/002 (2013.01)

(58) Field of Classification Search
CPC .................................................. C03C 21/002
USPC ......................................................... 428/426
See application file for complete search history.

(56) References Cited

U.S. PATENT DOCUMENTS

| | | | | |
|---|---|---|---|---|
| 3,764,444 A | * | 10/1973 | Simmons | C03C 10/0027 501/7 |
| 3,779,856 A | * | 12/1973 | Pirooz | C03B 32/00 501/7 |
| 4,218,512 A | * | 8/1980 | Allersma | C03C 10/0027 428/410 |
| 4,814,297 A | * | 3/1989 | Beall | C03C 10/0036 501/7 |
| 5,084,328 A | * | 1/1992 | Fine | C03C 10/0045 428/428 |

(Continued)

FOREIGN PATENT DOCUMENTS

| | | |
|---|---|---|
| CN | 105712632 | 6/2016 |
| CN | 108409147 | 8/2018 |
| DE | 102014009767 | 1/2016 |

OTHER PUBLICATIONS

International Search Report dated Apr. 10, 2019 for corresponding International Application PCT/CN2018/109715, 5 pages.

(Continued)

*Primary Examiner* — Lauren R Colgan
(74) *Attorney, Agent, or Firm* — Ruggiero McAllister & McMahon LLC (57) ABSTRACT

An ultrathin glass-ceramic article is provided having an article thickness (t) of equal to or less than 0.3 mm and an outer surface followed towards the inside of the article by an outer layer and a central part. The glass-ceramic has a crystal phase and an amorphous phase and the outer layer includes the crystal phase. The article has a gradient structure or a layered structure.

18 Claims, 2 Drawing Sheets

(56) References Cited

U.S. PATENT DOCUMENTS

| | | | | |
|---|---|---|---|---|
| 7,157,149 | B2* | 1/2007 | Belykh | C03C 23/00 |
| | | | | 428/688 |
| 7,871,706 | B2* | 1/2011 | Zhang | B82Y 30/00 |
| | | | | 428/428 |
| 8,257,831 | B2* | 9/2012 | Yagi | C03C 3/083 |
| | | | | 428/432 |
| 8,977,097 | B2* | 3/2015 | Filgas | H01S 3/0612 |
| | | | | 385/129 |
| 9,249,045 | B2* | 2/2016 | Gabel | C03B 32/02 |
| 9,604,871 | B2 | 3/2017 | Amin | |
| 10,570,055 | B2* | 2/2020 | Boek | C03C 10/0018 |
| 2005/0153142 | A1* | 7/2005 | Belykh | C03C 10/0027 |
| | | | | 427/372.2 |
| 2011/0048530 | A1* | 3/2011 | Marjanovic | C03C 17/3678 |
| | | | | 136/258 |
| 2012/0040146 | A1* | 2/2012 | Garner | C03C 17/28 |
| | | | | 65/53 |
| 2013/0164509 | A1* | 6/2013 | Siebers | F24C 15/10 |
| | | | | 428/210 |
| 2014/0356605 | A1* | 12/2014 | Adib | C03C 3/093 |
| | | | | 65/30.13 |
| 2015/0152558 | A1* | 6/2015 | Walther | C23C 28/04 |
| | | | | 428/354 |
| 2016/0031752 | A1* | 2/2016 | Maschmeyer | C03C 21/002 |
| | | | | 428/156 |
| 2016/0083282 | A1 | 3/2016 | Jouanno | |
| 2016/0176752 | A1* | 6/2016 | Gabel | C03C 23/007 |
| | | | | 501/4 |
| 2017/0215231 | A1* | 7/2017 | Doerk | C03C 3/083 |
| 2017/0215236 | A1* | 7/2017 | Doerk | C03C 3/097 |
| 2017/0233287 | A1* | 8/2017 | Li | C03C 3/068 |
| | | | | 428/172 |
| 2019/0300426 | A1* | 10/2019 | Fu | C03C 21/002 |
| 2020/0262746 | A1* | 8/2020 | He | B32B 27/325 |
| 2021/0238085 | A1* | 8/2021 | Li | C03C 3/089 |

OTHER PUBLICATIONS

Written Opinion of International Searching Authority dated Apr. 10, 2019 for corresponding International Application PCT/CN2018/109715, 4 pages.

ISO 7991 : 1987 (E).

International Preliminary Report on Patentability dated Apr. 8, 2021 for corresponding International Application PCT/CN2018/109715, 5 pages.

Ye, "Physical Chemistry of Inorganic Materials", China Construction Industry Press, Jul. 1986, p. 289-291, with English translation.

Shao, "Silicate Petrography", Wuhan University of Technology Press, Jun. 1996, p. 259-264, with English translation.

\* cited by examiner

ULTRATHIN GLASS CERAMIC ARTICLE AND METHOD FOR PRODUCING AN ULTRATHIN GLASS CERAMIC ARTICLE

CROSS REFERENCE TO RELATED APPLICATION

This application is a continuation of International Patent Application No. PCT/CN2018/109715, filed Oct. 10, 2018 the contents of which are incorporated by reference herein in their entirety.

BACKGROUND OF THE DISCLOSURE

1. Field of the Disclosure

The present invention relates to an ultrathin article in thickness range of 0.01-0.3 mm comprising a glass-ceramic having a crystal phase and an amorphous phase with improved mechanical strength, i.e., scratch resistance, impact resistance, and mechanical reliability after scratching. The invention is also related to a method of producing such a glass-ceramic article and to the use of the glass-ceramic article as flexible universal plane in flexible and printed electronics, sensor for touch control panels, finger print sensors, thin film battery substrates, mobile electronic devices, semiconductor interposers, bendable displays, solar cells, or other applications where a combination of high chemical stability, temperature stability, low gas permeability, flexibility, and low thickness is necessary. Besides consumer and industrial electronics (e.g., as cover for flexible/foldable smartphones and tablets) said invention can also be used for protection applications in industrial production or metrology. Another addressed application field is the use as back-cover of mobile devices, e.g., smart phones, tablets etc, and further the use as diffusor for various applications.

2. Description of the Related Art

Transparent glasses and polymers are used as cover material for displays, mobile devices and other electronic devices. Glasses and polymers with lower transparency are e.g., used as diffusors for various applications or as material for back-cover applications. Typically, a high or a lower transparency, break resistance, scratch resistance, high bendability, pen drop and ball drop properties are desired and necessary for these applications. However, a material which fulfills all of the desired properties to a high extent is not known in the state of the art. For example, glass has a quite low break resistance and poor anti-scratch resistance due to quite low hardness, while the break resistance of polymers is better but the scratch resistance of polymers is even worse. In ball drop and pen drop tests, thin glasses and polymers in display application show clear weaknesses. Especially pen drop tests in flexible display application show low breakage heights e.g., only a few centimeters (depending on lamination). In polymers irreversible respectively permanent defects caused for example by pen drop or other impacts can be found.

Another known material are glass-ceramics. A glass-ceramic is understood to be a material which is produced by a) melting a vitreous or amorphous, i.e., essentially crystallite-free precursor material, known as the glass melt, from glass raw materials, b) producing a desired shape, preferably via hot forming a green glass, b) cooling the green glass generally until complete solidification to form a vitreous body, d) optionally cutting a larger green glass body into small pieces, d) subsequently reheating the green glass body or the pieces by means of a heat treatment to a temperature below the melting temperature and thus producing the glass-ceramic by controlled crystallization of the green glass. Within the meaning of the present invention, a glass-ceramic is thus a material which has been produced by melting and subsequently converted by means of a controlled heat treatment (ceramization) into a glass-ceramic, a material where crystals are homogenously distributed in the volume of the material and there is residual glass phase between the crystals.

Glass-ceramic often has a high scratch resistance. However, due to high brittleness, it has low break resistance upon bending and also a low impact resistance.

Therefore, it is an object of the present invention to find a new material having an improved mechanical reliability which is especially suitable for use in the above-mentioned application fields.

SUMMARY

The above identified technical problem is solved by an ultrathin glass-ceramic article disclosed herein. According to one aspect of the invention, the glass-ceramic has a gradient structure. According to another aspect of the invention, the glass-ceramic has a layered structure. Thus, an ultrathin gradient or layered glass-ceramic is provided having several advantages: excellent transparency when needed (depending on the application), enhanced mechanical strength contributed by the crystalline phase itself and its strengthening effect as a secondary phase, being chemically toughenable for further improvement on mechanical strength, especially for impact strength (i.e., pen drop, ball drop), residue flexural strength after scratching.

According to one aspect of the invention the ultrathin glass-ceramic (UTGC) article has an article thickness (t) of equal to or less than 0.3 mm, an outer surface followed towards the inside of the article by an outer layer (which can be also called "outer section" or "outer part" or "outer area"), and a central part (or "central layer" or "central area" or "bulk"). The glass ceramic comprises a crystal phase and an amorphous phase (also called "glassy phase" or "vitreous phase" or "glass matrix"), and there is crystal phase in the outer layer. The crystal phase is composed of tiny crystallites of one kind or of different kinds. The proportion of the crystal phase in the outer layer (first layer) measured at the outer surface is different from the proportion of the crystal phase in the central part of the article. Thus a) the article has a gradient crystalline structure with an increasing or decreasing crystal volume proportion from the outer surface towards the central part of the article or b) the article has a layered structure wherein the outer layer has an essentially homogeneous crystal volume proportion and the central part is amorphous (i.e., consist of glass) or the central part also comprises crystals with an essentially homogeneous crystal volume proportion different from that of the outer layer.

According to one aspect, the glass-ceramic article according to the invention has a gradient structure concerning the proportion of crystal phase and can thus be indicated as gradient glass-ceramic article. Referring to a vertical cross section through the glass-ceramic article the amount of crystals alters from the outer surface towards the central part in a continuous way (increasing or decreasing). The region or section of the article with altering proportion of crystal phase is designated as "outer layer". Because of the gradual change of crystal phase proportion it is not common to give exact thickness values for the outer layer(s) and the central part.

According to another aspect, the glass-ceramic article according to the invention has a layered structure and can thus be indicated as layered glass-ceramic article. Referring to a vertical cross section through the glass-ceramic article the amount of crystals is essentially constant in in a first section (designated as "outer layer") and it rapidly jumps to a lower or higher essentially constant amount of crystals in a second section (designated as "central part"). Thus, there are several layers, wherein each layer has its special homogeneous glass distribution or homogeneous crystal to glass distribution.

For both above described variants the thicknesses of layers are defined and determined as follows: 1) Cutting the glass-ceramic sample; 2) Polishing the cross section of the cutting part; 3) EDS (energy dispersive X-ray spectroscopy) line scanning the surface of the cross section in a direction perpendicular to the outer surfaces of the article several times at different areas of the cross section (at least 3 times). The intersection between the two layers can be observed by the composition difference. Upon line scanning, the boundary between the outer layer and the central part is defined as the point where the respective decreasing or increasing measurement value changes into an essentially constant measurement value or where an essentially constant measurement values jumps to another essentially constant measurement value.

"Essentially constant" in the purpose of the present invention means that the measurement values in the respective section do not have to be constant in a stringent mathematical sense. Essentially constant means that the average of the measurement values do not change in a directed way (increasing, decreasing) and the single measurement values fluctuate around the average within the limits defined by typical mathematical methods, e.g., defined by the standard deviation.

According to the invention, the gradient of crystal phase or the layered structure is deliberately set depending on the used green glass composition and can be determined by measuring the proportion of crystal phase at the outer surface and in the central part of the respective article. The term "glass-ceramic article" does not require that the article has crystal phase in each region. Glass-ceramic articles in the purpose of the invention are also articles having crystal phase in the outer layer(s) while the central part can be amorphous (i.e., pure glass).

Surprisingly it was found by the inventors that an ultrathin glass-ceramic article, having a designed gradient or layered structure, overcomes the weakness of mechanical strength of pure glass articles and pure glass-ceramic articles by substantially increasing impact resistance, for example pen drop behavior. A gradient or layered glass-ceramic also provides high strength after scratching, especially in the case of glass-ceramics which are chemically toughened. At the same time, thin and ultrathin glass-ceramic can be transparent by controlling the size of the crystal phase. Before ceramization, the glass is drawable.

Glass-ceramic article: The article can be of any size. For example prior to ceramization it could be a long ultrathin green glass ribbon that is rolled (green glass roll), a large glass-ceramic sheet, a smaller glass-ceramic part cut out of a green glass roll or out of a green glass sheet or cut out of a green glass ingot, block or bar and being ceramized or a single small glass-ceramic article (like a finger print sensor (FPS) or display cover glass) etc.

Ultrathin glass-ceramic article: In the purpose of this invention ultrathin glass-ceramic article is an article with a thickness of equal to or less than 0.3 mm, preferably equal to or less than 0.25 mm, preferred of equal to or less than 0.145 mm, especially more preferred of equal to or less than 0.1 mm, preferably equal to or less than 0.07 mm, preferably equal to or less than 0.05 mm, preferably equal to or less than 0.03 mm.

Thickness (t): The thickness of a glass or glass-ceramic article is the arithmetic average of the thickness of the sample to be measured.

Compressive Stress (CS): The induced compression among glass network after ion-exchange on the surface layer of glass or glass-ceramic. Such compression could not be released by deformation of glass or glass-ceramic and sustained as stress. CS decreases from a maximum value at the surface of the article (surface CS) towards the inside of the article. Commercially available test machine such as FSM6000 (company "Luceo Co., Ltd.", Japan, Tokyo) and SLP1000 (Orihara Industrial Co., Ltd.) could measure the CS by waveguide and scattered light polarization mechanism, respectively.

Depth of Layer (DoL): The thickness of ion-exchanged layer where CS exists on the surface of glass or glass-ceramic. Commercially available test machine such as FSM6000 (company "Luceo Co., Ltd.", Japan, Tokyo) and SLP1000 (Orihara Industrial Co., Ltd.) could measure the DoL by wave guide mechanism.

Central Tension (CT): When CS is induced on one side or both sides of single glass or glass-ceramic sheet, to balance the stress according to the 3rd principle of Newton's law, a tension stress must be induced in the center region of glass or glass-ceramic, and it is called central tension. CT could be calculated from measured CS and DoL.

Average roughness (Ra): A measure of the texture of a surface. It is quantified by the vertical deviations of a real surface from its ideal form. Commonly amplitude parameters characterize the surface based on the vertical deviations of the roughness profile from the mean line. Ra is arithmetic average of the absolute values of these vertical deviations.

Breakage height: The breakage height is the height (given in mm) from which an object of a defined weight can fall onto a glass or glass-ceramic article (further referred to as "article") until the article breaks (that means: cracks are generated). The breakage height is determined by a pen drop test and/or a ball drop test which is described in more detail below.

Pen drop test: For this dynamic test samples of articles are prepared as follows: The article is placed with its second surface on a 100 μm substrate, which consists of 50 μm thick layer of polyethylene (PE) material and a 50 μm thick layer of a pressure sensitive adhesive (PSA) material from 3M. In order to make and to ensure a tight homogenous contact between the article and the PSA layer the article and the PSA layer are homogenously loaded with a surface load of 2 g per mm2. The article is placed on a rigid support (e.g., a table) so that the PE-layer is in contact with the support and the first surface of the article is orientated upwards. Then the not laminated first surface of the article is impacted by a defined testing pen. The testing pen is a 4.5 g pen having a ball-point with a diameter of 300 μm made from tungsten carbide. For the test, the pen is placed in a testing machine with a certain, recorded height above the article, the longitudinal axis of the pen being orientated vertically to the first surface of the article wherein the ball-point is facing the article. Then the testing machine lets the pen drop onto the first surface. If the article is not broken, the drop height of the pen is increased step by step by a predetermined amount and the article is moved a little bit in order to avoid double or multiple hits onto the same point of the article. This procedure is repeated until the article breaks. The test is performed on small samples (e.g., 20 mm×50 mm) at room temperature of about 20° C. and relative humidity of about 50%. If a article of larger size is to be tested, small samples will be cut out using a diamond cutting wheel. No further edge treatment is performed on the small samples. The breakage height (also called "pen drop height") is the maximum height that can be applied when the article breaks. Breaking means that the article gets a visible surface crack (crack is generated) or breaks into two or several pieces for the first time. The breakage is determined by the observation of naked eyes.

Ball drop test: An article is placed with its second surface on a 100 µm substrate which consists of 100 µm PET. The substrate is placed on a steel plate wherein the first surface of the article is orientated upwards and impacted until breakage by a 20 g steel ball. For the test, the ball is placed in a testing machine with a certain, recorded height above the article. Then the testing machine lets the ball drop onto the first surface. If the article is not broken, the drop height of the ball is increased step by step by a predetermined amount and the article is moved a little bit in order to avoid double or multiple hits onto the same point of the article. This procedure is repeated until the article breaks. The test is performed on small samples (e.g., 50 mm×50 mm) at room temperature of about 20° C. and relative humidity of about 50%. The breakage height (also called "ball drop height") is the maximum height that can be applied when the article breaks. Breaking means that the article gets a visible surface crack (crack is generated) or breaks into two or several pieces for the first time. The breakage is determined by the observation of naked eyes.

Breakage bending radius (BBR): The breakage bending radius (given in mm) is the minimum radius (r) of the arc at the bending position where a glass or glass ceramic article reaches the maximum deflection before kinking or damaging or breaking. It is measured as the inside curvature at the bending position of the article. A smaller radius means greater flexibility and deflection of the material. The bending radius is a parameter depending on the article thickness, the Young's modulus and the glass, glass-ceramic strength. Chemically toughened ultrathin glass ceramic has very small thickness, low Young's modulus and high strength. All the three factors contribute to low bending radius and better flexibility. BBR is determined in a 2 point bending test as described now. The breakage bending radius is determined by using a UTM (universal testing machine) on small samples (e.g., 20 mm×70 mm) at room temperature of about 20° C. and relative humidity of about 50%. If an article of larger size is to be tested, small samples will be cut out using a diamond cutting wheel. The article is brought into a bent position and its opposite ends are positioned between two parallel plates (steel plates). Then the distance between the plates is lowered so that the bending radius of the article decreases wherein the loading speed is 60 mm/min. The distance between the plates is recorded when the ultrathin article is kinking or damaging or breaking into two or several piece which is determined by the signal of the UTM software. From that distance the corresponding bending radius of the article at the time of breakage is calculated. This 2 point bending test is adjusted to and is especially suitable for ultrathin articles and reproduces in a quite simple manner the above mentioned problem, that is the bending of an article (e.g., a touch display) upon loading it.

In this context of the invention it was found out that the 2 point bending method is more meaningful for measuring the bendability of ultrathin articles than other known bending strength tests such as 3 and 4 point bending tests.

As mentioned above a article according to the invention can have quite different sizes. Therefore, in the course of determining the breakage height and breakage bending radius the following has to be taken into account:

In the case of larger glass articles (e.g., a glass roll or a large glass sheet), a plurality of samples are measured regarding breakage height using the pen drop test and/or the ball drop test. For this a random sample N values is taken. N should be high enough to obtain a statistically ensured average value. Preferably at least 20, more preferably at least 30 samples are tested. The number of samples depends on the respective size of the article to be tested. The measured values are statistically evaluated using Weibull method. B10 value of Weibull distribution (that is the calculated height (in mm) wherein 10% of the samples are broken) is determined and taken to represent the claimed breakage height.

However, in the case of small articles (e.g., an individual small cover glass) a single measured value of breakage height is sufficient and is taken to represent claimed breakage height.

In the case of a number of measured values between 2 and 19, the average of measured breaking height is taken to represent the claimed breakage height.

For the breakage bending radius an average value can be calculated. For this a random sample of N values is taken. The number of samples depends on the respective size of the glass article to be evaluated. Preferably N should be high enough to obtain a statistically ensured average value. Preferably at least 20, more preferably at least 30 samples are tested. Thus, a random sample of N values is taken for the breakage bending radii R1 . . . RN, and, for the values of these random samples, the average value $$\langle R \rangle = \frac{1}{N} \sum_{i=1}^{N} R_i$$

and the variance $$s = \sqrt{\frac{1}{N-1} \sum_{i=1}^{N} (R_i - \langle R \rangle)^2}$$

are calculated.

The average breakage bending radius is taken to represent claimed breakage bending radius. However, in the case of small glass articles (e.g., an individual small cover glass) a single measured value of breakage bending radius is sufficient and is taken to represent claimed breakage bending radius.

Average value and variance of the breakage height are calculated accordingly.

Scratch resistance and three point bending (3PB) method: The test is performed on small samples (e.g., 10 mm×10 mm). A corundum Vicker-Indenter scratches on the surface of the glass or glass-ceramic article by a load of 5N. Afterwards the residue strength of the article is measured by a three point bending (3PB) method. By this method, the surface hardness of different materials can be compared by creating defects on the material surface using a defined indenter and subsequently determining the flexural strength of the article in a 3PB test. Less scratch is induced on a material having a higher surface hardness. Thus, a material having a high flexural strength after scratching also has a high surface hardness, i.e., scratch resistance. A test method is designed by measuring the residue 3PB strength of an article after scratching by a Vicker indenter with a load of 5N as follows: The scratched surface of the article is placed downward on a supporting fixture with a span of 6 mm. A force is loaded with a speed of 10 mm/min at room temperature of about 20° C. and relative humidity of about 50% on the top surface until the article breaks. The strength is calculated by $$\sigma = \frac{3fl}{2dt^2}$$

"σ" is the flexural strength, "f" is the loading force, "l" is the supporting span, "d" and "t" are the width and thickness of tested sample, respectively.

Crystal phase and size: XRD (X-ray diffraction) was employed to measure the kind of crystal phase and the size of the crystals. The size is calculated by Scherrer's formula.

$$\tau = \frac{0.9\lambda}{\beta \cos\theta}$$

"τ" is the average size of the crystal. "β" is the line broadening at half the maximum intensity (FWHM). "e" is the Bragg angle. "λ" is the wavelength of the scanning X ray.

Vickers hardness: For determining the Vickers hardness an article to be tested is placed on a steel plate and loaded with a load of 200 g for 25 s using a Vicker indenter (having a diamond in the form of a square-based pyramid). Five measurements were taken to generate an average value. Vicker hardness is calculated by the formula $$HV \approx 0.1891 \frac{F}{d^2} [N/mm^2]_s$$

wherein "F" is the testing force and "d" is the average length of the diagonals left by the indenter.

DETAILED DESCRIPTION

As described above, the invention provides a gradient or layered glass-ceramic article. The ultrathin article has a thickness of equal to or less than 0.3 mm, and is composed of different "layers", "parts", "sections" or "areas" having different proportions of crystal phase, i.e., the glass-ceramic article has a gradient structure. Because of the gradient structure, there are no real layers with distinct boundaries in the glass-ceramic article. Alternatively, the article has a layered structure with distinct boundaries within.

The crystal phase formed can be of different kinds depending on the composition of the starting green glass. The crystal phase can be α-quartz, β-quartz, cristobalite, tridymite, β-eucryptite, β-spodumene, enstatite, wollastonite, diopside, K-fluorrichterite, cordierite, nepheline, lithium disilicate, lithium metasilicate, fluorophlogopite, leucite, mullite, spinel, rutile, fluoroapatite, monazite, or mixture of the mentioned crystal phases. Especially preferred according to the invention are leucite, nepheline, β-spodumene, lithium disilicate, lithium metasilicate, magnesium dititanate.

Ceramizable glasses may be used for the invention, including lithium aluminum silicate glass ceramics (LAS), lithium silicate glass ceramics, magnesium/zinc aluminosilicate glass ceramics (MAS), magnesium silicate glass ceramics, sodium/potassium aluminosilicate glass ceramics (NaAS, KAS), phosphate glass ceramics (phosphate GC), calcium aluminosilicate glass ceramics, with compositions as below. Glass-ceramics preferably suitable for the intended applications are preferably alumina silicate based glasses such as lithium-alum inate-silicate (LAS), magnesium-aluminate-slicate (MAS), zinc-aluminate-silicate (ZAS), sodium-aluminate-silicate (NAS), lithium-disilicate (LDS), systems but not limited to. Preferably the glass-ceramic article comprises the following components in the indicated amounts (in wt. %): 40-85% $SiO_2$, 0-15% $B_2O_3$, 0-40% $Al_2O_3$, 0-15% $Li_2O$, 0-20% $Na_2O$, 0-20% $K_2O$, 0-12% $ZnO$, 0-15% $P_2O_5$, 0-18% $TiO_2$, 0-5% $Ag_2O$, 0-3% $CeO_2$, 0-3% $MnO_2$, 0-3% $Co_2O_3$, 0-3% $Fe_2O_3$, 0-45% MgO, 0-8% BaO, 0-18% CaO, 0-15% $ZrO_2$, 0-3% F, 0-3% $Sb_2O_3$.

Lithium aluminum silicate glass ceramics (LAS, comprising in wt %):

$Al_2O_3$: 17-30 wt %
$SiO_2$: 55-75 wt %
$Li_2O$: 2.2-5.5 wt %
$K_2O$: 0-3 wt %
$Na_2O$: 0-3 wt %
$Na_2O+K_2O$: 0-4 wt %
MgO: 0-3 wt %
CaO: 0-2.5 wt %
SrO: 0-2 wt %
BaO: 0-4 wt %
ZnO: 0-4 wt %
$B_2O_3$: 0-2 wt %
$P_2O_5$: 0-8 wt %
$SnO_2$: 0-1 wt %
$TiO_2$: 0-5.5 wt %
$ZrO_2$: 0-3.0 wt %
$TiO_2+ZrO_2$: 2-6 wt %.

Lithium silicate glass ceramics (Li-disilicate, metasilicate), (comprising in wt %):

$Al_2O_3$: 2-25 wt %
$SiO_2$: 60-85 wt %
$Li_2O$: 5-15 wt %
$K_2O + Na_2O$: 0-13 wt %
Ag, Au: <0.2 wt %.

Magnesium/zinc aluminosilicate glass ceramics (MAS): (spinel, gahnite, cordierite, enstatite)Spinel/gahnite (comprising in wt %):

| | |
|---|---|
| SiO$_2$: | 15-60 wt % |
| Al$_2$O$_3$: | 20-50 wt % |
| MgO: | 0-40 wt %, |
| ZnO: | 0-40 wt %, |
| MgO + ZnO: | 10-50 wt %. |

Cordierite (comprising in wt %

| | |
|---|---|
| SiO$_2$: | 35-60 wt % |
| Al$_2$O$_3$: | 6.5-40 wt % |
| MgO: | 6-22 wt % |
| B$_2$O$_3$: | 0-10 wt % |
| CaO, BaO, SrO: | 0-6 wt % |
| ZnO: | 0-7.5 wt % |
| TiO$_2$: | 1-15 wt % |
| ZrO$_2$: | 0-10 wt % |
| As$_2$O$_3$ + Sb$_2$O$_3$: | 0-2 wt %. |

Enstatite (comprising in wt %):

| | |
|---|---|
| MgO: | 20-35 wt % |
| Al$_2$O$_3$: | 2-12 wt % |
| SiO$_2$: | 40-70 wt % |
| Li$_2$O: | 0-2 wt % |
| CaO: | 0-4 wt % |
| SrO: | 0-12 wt % |
| BaO: | 0-17 wt % |
| ZrO$_2$: | 0-15 wt % |
| TiO$_2$: | 0-15 wt %. |

Magnesium silicate (forsterite) (comprising in wt %):

| | |
|---|---|
| SiO$_2$: | 30-60 wt % |
| Al$_2$O$_3$: | 10-25 wt % |
| MgO: | 13-30 wt % |
| K$_2$O: | 0-20 wt % |
| Na$_2$O: | 0-10 wt % |
| TiO$_2$: | 0-15 wt % |
| GeO$_2$: | 0-25 wt %. |

Sodium/potassium aluminosilicate glass ceramics (NaAS, KAS) (nepheline, kalsilite) comprising (in wt %):

| | |
|---|---|
| Na$_2$O + K$_2$O: | 5-40 wt % |
| Al$_2$O$_3$: | 10-40 wt % |
| SiO$_2$: | 25-75 wt % |
| CaO + BaO + MgO: | 0-18 wt % |
| TiO$_2$: | <10 wt % |
| ZrO$_2$: | <10 wt %; | preferably:

| | |
|---|---|
| Na$_2$O + K$_2$O: | 10-30 wt % |
| Al$_2$O$_3$: | 10-35 wt % |
| SiO$_2$: | 30-55 wt %. |

Phosphate glass ceramics (comprising in wt %):
(apatite, LISICON, BPO4) Apatite (comprising in wt %):

| | |
|---|---|
| CaO: | 5-45 wt % |
| Al$_2$O$_3$: | 5-38 wt % |
| P$_2$O$_5$: | 10-26 wt % |
| SiO$_2$: | 10-60 wt % |
| MgO: | 0-26 wt % |
| K$_2$O, Na$_2$O, Li$_2$O: | 0-10 wt % |
| TiO$_2$, ZrO$_2$: | 0-10 wt % |

LISICON (comprising in wt %):

| | |
|---|---|
| Al$_2$O$_3$: | 0-20; preferably 4-18; more preferably 6-15.5 |
| GeO$_2$: | 0-38; preferably <20; more preferably <10 |
| Li$_2$O: | 2-12; preferably 4-8 |
| P$_2$O$_5$: | 30-55 |
| TiO$_2$: | 0-35 |
| ZrO$_2$: | 0-16 |
| SiO$_2$: | 0-15 |
| Cr$_2$O$_3$ + Fe$_2$O$_3$: | 0-15 |
| Ga$_2$O$_3$: | 0-15 |
| Ta$_2$O$_5$: | 0-36.5 |
| Nb$_2$O$_5$: | 0-30 |

Halogenides: <5, preferably <3, more preferably <0.3
M$_2$O: <1; preferably <0.1; with M being an alkali cation, with the exception of
Li+.
BPO4 (comprising in wt %):

| | |
|---|---|
| SiO$_2$: | 10-50 wt % |
| B$_2$O$_3$: | 5-40 wt % |
| P$_2$O$_5$: | 25-75 wt % |
| refining agents: | <5 wt % |
| M3$_2$O$_3$, M5$_2$O$_5$ and M4O$_2$: | <10 wt %. |

Calcium aluminosilicate (comprising in wt %): Wollastonite (comprising in wt %):

| | |
|---|---|
| SiO$_2$: | 50-65 wt % |
| Al$_2$O$_3$: | 0-13 wt % |
| CaO: | 15-55 wt % |
| ZnO: | 2-10 wt % |
| K$_2$O, Li$_2$O, Na$_2$O: | 0-5 wt % |
| P$_2$O$_5$: | 0-10 wt % |

Anorthite (comprising in wt %):

| | |
|---|---|
| SiO$_2$ | 15-54 wt % |
| Al$_2$O$_3$ | 13-40 wt % |
| CaO | 5-22 wt % |
| BaO, MgO | 0-10 wt % |
| TiO$_2$ | 0-12 wt % |

The above given compositions can further comprise refining agents such as As2O3, Sb2O3, CeO2, sulphate compounds and/or halide compounds up to a total sum of about 2 wt %.

Further glasses that are suitable for the method for producing a ceramizable green glass component are photosensitive glasses. Such a glass is sensitized, that means it is more sensitive to irradiation with ultraviolet light and can be crystallized more easily and with greater aspect ratios than a non-sensitized glass of the same composition.

According to one advantageous embodiment the size of the formed crystals is <500 nm, preferably <200 nm, preferably <150 nm, preferably <120 nm, preferably <100 nm, preferably <90 nm, preferably <80 nm, preferably <70 nm, preferably <60 nm. Some advantageous variants have a crystal size of <50 nm, preferably <40 nm. There are several advantage of controlling the grain size in a smaller level:

Firstly, gradient crystallization concentration can be formed in the glass-ceramic article. The gradient (abbreviated as G) could be define by the ratio of "crystal volume proportion in the outer layer" (measured at or near the outer surface) to "crystal volume proportion in the central part of the article". E.g., for a 100 µm ultrathin article, in the outer layer, the crystal volume proportion can be controlled to increase with the depth to have 30% at the depth of 10 µm. In the center part of the article we have 30% crystals. Thus, the gradient would be 3% per µm. In another example having a layered structure, for a 100 µm ultrathin article, in the outer layer, the crystal volume proportion can be 30% and keep the same to have 30% at the depth of 10 µm. In the center part of the article, there is glass phase without crystals, i.e., the central part is amorphous. Thus, the gradient would be 0% per µm. It should generally be noted that all % values given for the proportion of crystal phase or amorphous phase refer to vol %.

Secondly, when the crystal grain size is smaller than 500 nm, preferably <200 nm, preferably <100 nm, preferably <50 nm the light transmission can be improved, especially when the grain size is smaller than the light wavelength, especially for the visible light (380 nm-780 nm), which makes the transparency of the glass ceramic-article possible. In a first advantageous embodiment said ultrathin glass-ceramic article has an average transmission higher than 50%, preferably >60%, preferably >75%, preferably >80%, preferably >85%, preferably >90%, preferably >95% at an article thickness of 100 µm in a spectral range 380-780 nm. An article having a high transmission can e.g., be used for cover glass or surface protection glass applications.

In a second advantageous embodiment said ultrathin glass-ceramic article has an average transmission higher than 5%, preferably >15%, preferably >25%, preferably >35%, preferably >45% in the range 380-780 nm at 100 µm thickness. An article having a quite low transmission can e.g., be used for back-cover applications, diffusor applications and other applications where high transparency is not required.

Thirdly, glass-ceramic with crystalline grains distributed in the glass matrix (amorphous phase) can significantly improve the mechanical strength of the whole body by two principles, one of which is the excellent mechanical strength of the grain itself and another one is the composite effect of grain distribution in the glass matrix. The grains can function as the secondary strengthening phase in the article. In this sense, smaller grains can increase the distribution density of the grains, which means the grains can function as crack blockers when the sample experiences external impact. Furthermore, the crystalline grain can deflect crack around its boundary, and the cracks in glass-ceramic leads to displacement of crystalline grain in the glass matrix. All of above-mentioned mechanisms require higher crack energies and result in higher crack resistance. Increased grain density result in higher resistance of cracking. Therefore, it is advantageous when the ratio of crystal size/article thickness (t) is >0.00005, preferably >0.0001, preferably >0.0005, preferably >0.001 and/or <1, preferably <0.1, preferably <0.01.

Fourthly, smaller grain size creates more residual glass phase connection between the grains. These short-distance connected residual glass phase function as the channel for ion exchange. If the grain size is too big, this big grains will isolate the residual glass phase, and the ion-exchange channel will be somehow blocked, which will lower the ion-exchange efficiency.

Fifthly, if the grain size was bigger than the DoL after chemically toughening, one big crystal would exist from the compressive stress layer to the central tension layer, which would influence the profile of the stress distribution and weaken the chemical toughening performance. In this sense, the grain size is also controlled by the ratio of grain size/Dol which is preferred less than <1, preferably <0.5, preferably <0.4, preferably <0.3, preferably <0.2, preferably <0.1, preferably <0.05.

According to an advantageous embodiment the article thickness t is lower than 300 µm, preferably less than or equal to 275 µm, preferably less than or equal to 250 µm, preferably less than or equal to 225 µm, preferably less than or equal to 200 µm, preferably less than or equal to 175 µm, preferably less than or equal to 145 µm, preferably less than or equal to 100 µm, preferably less than or equal to 70 µm, preferably less than or equal to 50 µm, preferably less than or equal to 30 µm, preferably less than or equal to 15 um and/or higher than or equal to 10 µm. Such particularly ultrathin articles are desired for various applications as described above. In particular, the thin thickness grants the article flexibility. Ultrathin glass-ceramic articles can also be used together with another thin glass or glass-ceramic element or with a thicker glass or glass-ceramic elements in order to build a laminated structure.

It is advantageous when the thickness of the outer layer (t1) of the article is in the range of >0 to t/3, wherein t is the total article thickness. Preferably the ratio of outer layer thickness/article thickness (t1/t) is >0.007, preferably >0.01, preferably >0.02.

In the following two alternative advantageous variants of gradient glass-ceramic articles will be described:

According to a first variant, the glass article has an increasing gradient structure such that the proportion of crystal phase in the outer layer is smaller than the proportion of crystal phase in the central part of the article. Here, the proportion of crystal phase in the outer layer is in the range 0.1 to 99 vol. %. In this kind of gradient glass ceramic both the outer layer and the central part of the article have a crystal phase of the desired kind. Such a glass ceramic article can for example be generated by volume crystallization caused by a special heat treatment. Such articles show great improvement of mechanical strength, i.e., scratch resistance and impact resistance (e.g., pen drop resistance). Preferably the proportion of crystal phase in the outer layer is in the range 1-40 vol. %, preferably 2-35 vol. %. In advantageous variants of the invention the proportion of crystal phase in the outer layer can be in the range 1-20 vol. %, preferably 2-15 vol. %. Further preferably the proportion of crystal phase in the central part is in the range 10-80 vol. %, preferably 15-75 vol. %. In advantageous variants of the invention the proportion of crystal phase in the central part can be in the range 20-60 vol. %, preferably 35-55 vol. %.

According to a second variant, the glass article has a decreasing gradient structure such that the proportion of crystal phase in the outer layer is higher than the proportion of crystal phase in the central part of the article. Here, the proportion of crystal phase in the outer layer is in the range 0.1 to 99.9 vol. %. This kind of glass ceramic can be generated by surface heat treatment (leading to surface crystallization), for example using a special laser, or by ion exchange applied on the green glass prior to ceramization in order to create a gradient distribution of certain ions. Such articles have improved anti-scratch properties due to high hardness of glass ceramic on the surface. Preferably the proportion of crystal phase in the outer layer is in the range 5-80 vol. %, preferably 10-75 vol. %. In advantageous variants of the invention the proportion of crystal phase in the outer layer can be in the range 5-60 vol. %, preferably 10-55 vol. %. Further preferably the proportion of crystal phase in the central part is in the range 0-70 vol. %, preferably 0-60 vol. %. I.e., this kind of gradient glass-ceramic may have a central part consisting of glass. In advantageous variants of the invention the proportion of crystal phase in the central part can be in the range 0-50 vol. %, preferably 0-40 vol. %.

In another advantageous variant of the invention the ultrathin glass ceramic article comprises a thin glassy zone on top of the outer layer, wherein the thickness of the glassy zone is in the range 1 to 400 nm, preferably in the range 3 to 300 nm, preferably in the range 5 to 200 nm. In an advantageous embodiment, the ratio of glass-zone-thickness/article thickness is less than 0.00125.

According to a further advantageous embodiment, the ultrathin glass-ceramic article according to the invention comprises a second outer surface located opposite to the first outer surface, and a second outer layer located between the second outer surface and the central part. So the thin gradient or layered glass-ceramic article has a sandwich structure: first outer surface, first outer layer, central part, second outer layer, second outer surface. In a variant of the invention, the thickness of the first outer layer is different from the thickness of the second outer layer.

According to a further development of the invention the ultrathin gradient or layered glass-ceramic article is chemically toughened preferably via an ion-exchange process which is described below. Chemically toughening improves the bending performance of the thin glass-ceramic article and other mechanical properties.

Preferably the article comprises a compressive stress region extending from the outer surface to a depth in the article (DoL), the region is defined by a compressive stress (CS) wherein a surface compressive stress (CS) at the outer surface is at least 100 MPa.

Some of the thin glass-ceramic articles can be chemically toughened in an advantageous embodiment. Thereafter, a compressive stress region extends from the outer surface to a first depth in the glass article (DoL), the region is defined by a compressive stress (CS) wherein a surface CS at the outer surface is at least 100 MPa. Such a toughened glass ceramic article has a breakage height (given in mm) of at least the figure of the thickness (t in mm) of the article multiplied by 200, wherein the breakage height is determined in a pen drop test as described above. By means of this criterion it can be decided whether a strengthened ultrathin glass-ceramic article is suitably strong enough to be used for the respective application before it becomes part of a product.

It was found that the breakage height is strongly related to crystallization ratio at certain article thickness and surface quality. Therefore, a thinner homogeneously crystallized glass-ceramic without gradient or layered structure having a high crystallization ratio is especially sensitive to breakage caused by impacts. Surprisingly it was found by the inventors that the breakage height criterion for an ultrathin gradient or layered glass-ceramic can be described by the inventive factor 200 and the thickness of the article. The inventive factor will be valid if the breakage height of the glass article is determined in the above defined pen drop test.

This test is adjusted to and is especially suitable for ultrathin glass-ceramic articles and reproduces in a quite simple manner the above mentioned problem, that is the impact contact between the glass-ceramic article (e.g., a touch display) and an external object when the article falls down or is hit.

According to an advantageous embodiment DoL is >0.01*t, preferably >0.05*t, preferably >0.1*t, t being the article thickness in the unit of micron. DoL being the depth of ion exchanged ions.

According to an advantageous embodiment the generated surface compressive stress (CS) of the article is more than 50 MPa, preferably >100 MPa, preferably higher than 150 MPa, more preferably higher than 200 MPa, more preferably higher than 300 MPa. According to preferred embodiments of the invention CS is equal to or more preferably higher than 400 MPa, more preferably higher than 500 MPa, more preferably higher than 600 MPa, further preferably higher than 700 MPa, further preferably higher than 800 MPa. However, CS should not be very high because the glass may otherwise be susceptible to self-breakage. Preferably, CS is equal to or lower than 2000 MPa, preferably equal to or lower than 1600 MPa, advantageously equal to or lower than 1500 MPa, more preferably equal to or lower than 1400 MPa. Some advantageous variants even have a CS of equal to or lower than 1300 MPa or equal to or lower than 1200 MPa.

In an advantageous variant the pen drop breakage height of the chemically toughened article is higher than t2/800 mm, preferably >t2/750 mm, preferably >t2/700 mm, preferably >t2/650 mm, wherein t is the article thickness in the unit of micron.

Further advantageous the ball drop breakage height of the chemically toughened article is higher than (t2/600)*mm, preferably >(t2/500)*mm, preferably >(t2/400)*mm, preferably >(t2/300)*mm using a 20 g steel ball, wherein t is the thickness of glass ceramic in the unit of micron.

According to a further advantageous variant the chemically toughened article has a bending radius<900*t mm, more preferable <700*t mm, even more preferable<600*t mm wherein t is the article thickness in the unit of millimeter.

In addition, a further test method is designed in order to evaluate the scratch resistance of the gradient or layered glass-ceramic article. Here, the residue 3PB strength of UTGC after scratching by a Vicker indenter with a load of 5N is measured. In an advantageous variant of the invention the gradient or layered glass-ceramic article has a 3PB value of >60 MPa, preferably >80 MPa, preferably >100 MPa before chemical toughening. Preferably the gradient or layered glass-ceramic article has a 3PB value of >100 MPa, preferably >120 MPa, preferably >140 MPa after chemical toughening. Depending on the type of gradient or layered glass-ceramic some advantageous articles have 3PB values of >200 MPa, preferably >300 MPa, preferably even >400 MPa after chemical toughening.

In an advantageous variant the ultra-thin glass-ceramic has a high vickers hardness of >400 MPa, preferably >450 MPa, preferably >500 MPa before chemical toughening. Preferably the chemical toughened ultra-thin glass ceramic possesses a Vickers hardness of >450 MPa, preferably >500 MPa, preferably >550 MPa.

In an advantageous embodiment of the ultrathin glass ceramic article the effective of CTE(A) of outer layer A is smaller than the CTE(B) of inner glass phase B. The effective CTE(A) of outer layer is preferably less than 13*10-6, is more preferably less than 11*10-6, is even more preferably less than 10*10-6 in a temperature interval of 20-300° C. The effective CTE(B) of inner layer B is preferably larger than 0*10-6, is more preferably larger than 1*10-6, is even more preferably larger than 2*10-6 in a temperature interval of 20-300° C. Thus there is a CTE difference between the outer layer A and the central part B. Preferably the CTE difference introduces a compressive stress on the layer A and extension stress in inner part B. CTE is preferably determined according to ISO 7991: 1987 (E).

According to further aspect of the invention a method for producing a thin glass-ceramic article having a gradient or layered structure is provided, comprising the following steps:
   a) providing a composition of raw materials for the desired green glass,
   b) melting the composition,
   c) producing a green glass article,
   d) allowing the green glass article to solidify,
   e) heating the green glass article or parts thereof to a temperature T above the ceramization temperature and holding at this temperature T for a period of time and as a result converting the green glass into a glass-ceramic having a desired crystal phase and an increasing or decreasing gradient structure or a layered structure from an outer surface towards the central part of the article,
   f) cooling the glass ceramic article.

First, a green glass is melted from raw materials (selected corresponding to the respective glass composition to be achieved), suitably formed and solidified to generate the precursor green glass article.

Of course, the corresponding precursor green glass ultrathin article could be produced by grinding and polishing or etching from thicker glass. These two methods are not economical and lead to a rough and maybe uneven surface quality which is quantified by Ra roughness, TTV (Total Thickness Variation) for example.

Direct hot-forming production, especially in a flat glass process like down draw, up draw, overflow fusion or float method are preferred for the mass production. Redraw method is also advantageous. These mentioned methods are economical, the glass surface quality is high (fire-polished) and the ultrathin glass with thickness from 5 µm (or even less) to 700 µm (or even higher) could be produced. For example, the down-draw/overflow fusion method could make pristine or fire-polished surface with roughness Ra less than 2 nm, preferred less than 1 nm, even preferred less than 0.5 nm, for example 0.4 or 0.3 nm. The thickness could also be precisely controlled ranging from 5 µm and 700 µm. Thin thickness grants high glass flexibility. Special float methods could also produce thin glass with pristine surface, it is economical and suitable for mass production, but the glass produced by float methods has one side as tin containing side which is different from the other side. The difference between these two sides would cause warp issue of glass after chemical toughening, and could affect printing or coating or bending or laminating process because the two sides of the article have e.g., different surface energy, morphologic deviations etc. Another variant of thin article can be produced by sawing an ultrathin green glass articles out of a thick glass ingot, bar, block etc.

The generated precursor green glass article is then crystallized to generate a gradient structure. Generally, crystallization can be formed in a heating process (laser treatment and/or heat treatment) and/or by ion exchange method after thin glass production. This can be done in batch or inline furnaces in controlled temperature and humidity environment. A roll to roll process is also feasible. By controlling the temperature/time program of the ceramization procedure (e.g., temperatures, heating rates, holding times at a defined temperature, cooling rates) the kind of crystal phase formed, the crystal size and the crystal volume proportion in the different parts of the glass-ceramic article can be adapted.

According to a first advantageous variant the ceramization step comprises heating the green glass article in a furnace up to a specific temperature for a specific time (holding time) wherein each glass-ceramic type requires its own typical ceramizing program.

Alternatively or additionally, the ceramization step comprises heating and/or irradiating the green glass article or parts thereof by a laser. Using this method it is possible to introduce heat into the article to be ceramized in a local way. For example, it is possible to only heat the surface or the bulk of the glass article in order to locally initiate crystallization in a certain depth of the article.

Alternatively or additionally, the green glass article can preferably be treated with a special laser prior to ceramization in order to influence the ceramization behavior of the green glass material.

In connection with special glass-ceramic systems (e.g., lithium silicate, and sodium silicate glass systems) is advantageous when prior to the ceramization step an ion-exchange is performed on the solidified green glass article to create a gradient ion distribution. After that, the green glass article is ceramized using a suitable method. Because of the gradient ion distribution in the green glass a glass-ceramic having a gradient structure is formed during the ceramization step.

To further improve the mechanical properties the thin glass-ceramic article can be chemically toughened/strengthened after ceramization with different known toughening processes, e.g., via an ion exchange process with salt bath or salt paste. Salts can be pure or mixed (e.g., $KNO_3$, $NaNO_3$, $CsNO_3$, $LiNO_3$, $Li_2SO_4$, $K_2SO_4$). In an advantageous further step the glass-ceramic article is chemically toughened wherein the step of chemical toughening preferably comprises an ion-exchange process.

The strengthening, as called as toughening, can be done by immersing the article into melt salt bath with cations, e.g., potassium ions, or by covering the glass e.g., by potassium ions or other alkaline metal ions contained paste and heating at high temperature at certain time. The alkaline metal ions with larger ion radius in the salt bath or the paste exchange with alkaline metal ions with smaller radius in the article, and surface compressive stress is formed due to ion exchange.

Further it is advantageous if the glass-ceramic article or a part of the glass-ceramic article is immersed in the salt bath at a temperature between 340° C. and 1200° C. for 30 seconds to 48 hours.

For some glass types it may be preferred if the chemical toughening comprises two consecutive toughening steps, wherein the first step comprises toughening with a first toughening agent and the second step comprises toughening with a second toughening agent. Preferably the first toughening agent and the second toughening agent comprise or consist of $KNO_3$ and/or $NaNO_3$ and/or mixtures thereof.

A chemically toughened glass-ceramic article of the invention is obtained by chemically toughening a chemically toughenable glass-ceramic article. The toughening process could be done by immersing the ultrathin article into a salt bath which contains monovalent ions to exchange with alkali ions inside glass. The monovalent ions in the salt bath has radius larger than alkali ions inside glass. A compressive stress to the glass is built up after ion-exchange due to larger ions squeezing in the glass network. After the ion-exchange, the strength and flexibility of ultrathin glass-ceramic are surprisingly and significantly improved. In addition, the CS induced by chemical toughening improves the bending properties of the toughened glass ceramic article and could increase scratch resistance of glass ceramic.

Further details of the toughening procedure and results have already been described above in connection with the described glass ceramic article.

A further aspect of the invention is the use of a thin glass ceramic article according to the invention as cover film for resistance screens, and expendable protective films for display screens, foldable/flexible phones, cameras, gaming gadget, tablet, laptops, TV, mirror, windows, aviation widows, furniture, and white goods. Preferably the inventive article can be used in the applications of industrial and consumer display substrate and cover, back-cover, fragile sensors, fingerprint sensor module substrate or cover, semiconductor package, thin film battery substrate and cover, foldable display, camera lens cover, OLEDs, PV and organic complementary metal-oxide-semiconductor (CMOS) and diffusors in various applications, e.g., lighting applications.

These and other aspects, advantages, and features will be described in more detail in the following paragraphs, drawings and appended claims, wherein the given figures are illustrative, schematic drawings.

Table 1 shows the compositions of several comparative embodiments (type 1-4) and inventive working embodiments (types 5-10) for direct hot-formed ultrathin glasses which are able to be ceramized with different kinds of crystal phases and to be chemically toughened.

proportion of crystals, whereby it applies that "x"<"xx"<"xxx". The term "glassy" means that there are no crystals, i.e., the central part is amorphous and consists of glass.

Figure 1A:
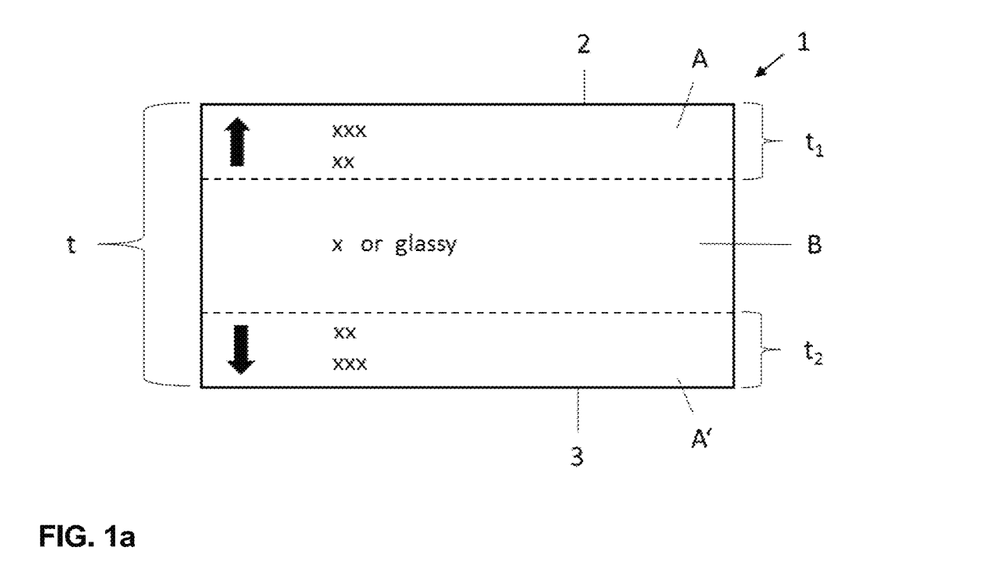
FIG. 1a glass-ceramic article according to the invention with decreasing gradient structure.
Figure 1B:
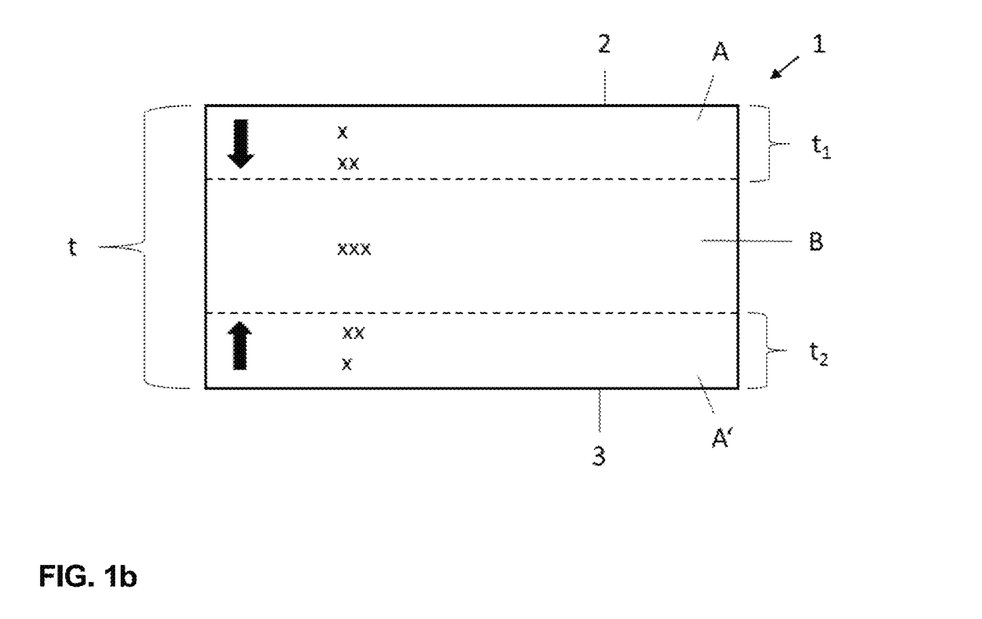
FIG. 1b glass-ceramic article according to the invention with increasing gradient structure.
Figure 1C:
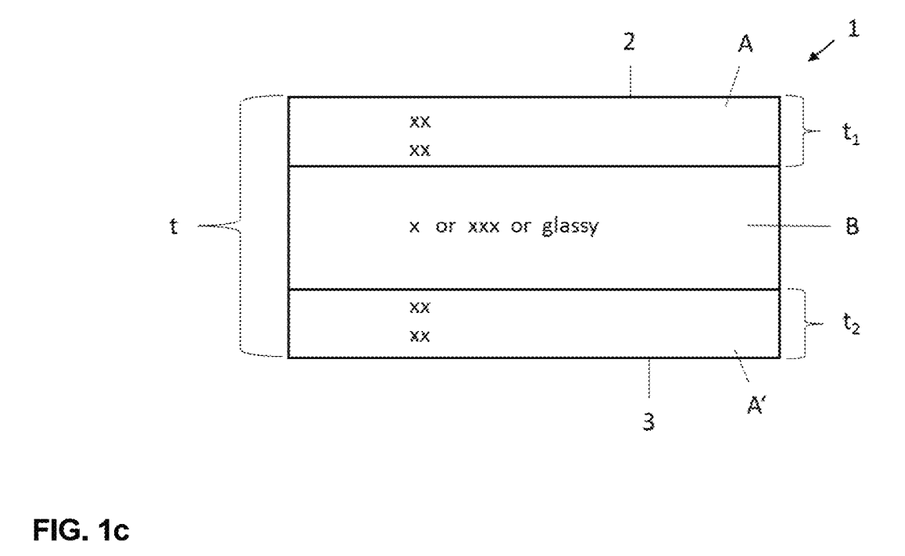
FIG. 1c glass-ceramic article according to the invention with layered structure.

The glass-ceramic articles 1 shown have the following structure: first outer surface 2, first outer layer A, central part B, second outer layer A' and second outer surface 3. The thickness of the first outer layer A is t1, the thickness of the second outer layer A' is t2. Here, the shown articles 1 have outer layers A, A' of the same thickness. However, of course the thicknesses t1 and t2 can be different.

FIG. 1a shows a glass-ceramic article 1 having a decreasing gradient structure, i.e., the volume proportion of crystals decreases from the outer surfaces A, A' towards the central part B. In the outer layers A, A', the proportion of crystals gradually or continuously changes. The central part B may have crystals with an essentially constant proportion, but in this case in a lower crystal volume proportion than that of the outer layers A, A'. Alternatively, the central part B may consists of glass, i.e., it is glassy.

FIG. 1b shows a glass-ceramic article 1 having an increasing gradient structure, i.e., the volume proportion of crystals increases from the outer surfaces A, A' towards the central part B. In the outer layers A, A', the proportion of crystals gradually or continuously changes. The central part B has crystals with an essentially constant proportion.

FIG. 1c shows a layered glass-ceramic article 1. In this type of embodiment the outer layers A, A' have an essentially homogeneous crystal volume proportion from the outer surfaces 2, 3 to a certain depth (thickness t1, t2). The

TABLE 1

Embodiments of UTGC composition of different types

| Composition wt. % | Type 1 | Type 2 | Type 3 | Type 4 | Type 5 | Type 6 | Type 7 | Type 8 | Type 9 | Type 10 |
|---|---|---|---|---|---|---|---|---|---|---|
| $SiO_2$ | 60 | 70 | 56 | 67 | 61.8 | 41.1 | 74.5 | 62 | 55 | 67 |
| $B_2O_3$ |  | 1 |  |  | 1.2 | 3.0 |  |  | 10.3 |  |
| $Al_2O_3$ | 20 | 19 | 26 | 20.25 | 21 | 26.3 | 4 | 10 | 22.1 | 19 |
| $Li_2O$ | 4 | 2.6 | 4 | 3 |  |  | 9.3 | 10 | 9.2 | 2 |
| $Na_2O$ | 11 | 0.3 | 0.2 | 0.4 | 7.2 | 14 | 2.6 | 7 |  |  |
| $K_2O$ | 1 | 0.1 | 0.5 | 0.5 | 9.7 | 5 | 4.1 | 4 |  |  |
| MgO |  | 1.9 | 1 | 1.5 |  | 3.1 |  | 2 |  | 5 |
| BaO |  |  |  | 0.9 | 1.0 |  |  |  |  |  |
| CaO | 1 |  |  | 0.05 | 2.5 | 1.3 |  |  |  |  |
| $ZrO_2$ | 2 | 2 | 1.8 | 1.8 | 0.1 |  |  |  |  | 3 |
| NaF |  |  |  |  |  |  | 2.5 |  |  |  |
| $AlF_3$ |  |  |  |  |  |  | 1.6 |  |  |  |
| ZnO |  | 1 | 1.5 | 1.9 |  |  |  | 1 |  |  |
| $P_2O_5$ |  |  | 7 |  |  |  |  | 3 |  |  |
| $TiO_2$ |  | 3 | 2 | 2.7 | 0.2 | 6 |  |  | 4.0 | 4 |
| $Sb_2O_3$ |  |  |  |  |  | 0.1 | 0.4 | 0.5 |  |  |
| KBr |  |  |  |  |  |  |  |  |  |  |
| $Ag_2O + CeO_2 + SnO_2 + Fe_2O_3$ |  | 0.1 |  |  | 0.3 | 0.1 | 0.25 | 0.5 |  |  |

Green glass articles 1 of the different glass types were produced either by down draw process or by producing a larger green glass body, mechanically cutting, grinding and polishing. Subsequently the green glass articles were ceramized to ultrathin glass-ceramics articles having different gradient or layered structures.

FIGS. 1a-1c show in a sketched way the principle of different embodiments of the present invention, wherein the following has to be explained:

The volume proportion of crystals rises in the direction of arrow.

"x" stands for the presence of crystals, wherein the number of "x" schematically represents the relative volume central part B also has an essentially homogeneous crystal volume proportion, which is higher or lower than that of the outer layers A, A'. Alternatively, the central part B can be glassy, i.e., consists of glass.

Figure 2:
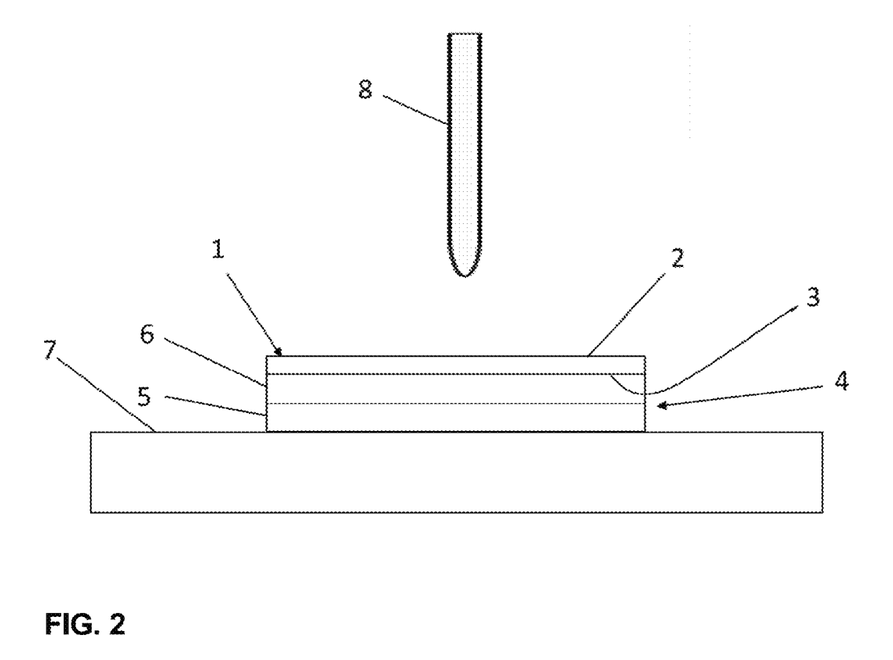
FIG. 2 a simplified schematic illustration of the pen drop test.

The impact resistance of chemically toughened and untoughened comparison and inventive working examples was tested with the pen drop test which was described in detail above. A simplified illustration of that test is shown in FIG. 2. As can be seen, an article 1 to be tested is placed with its second surface 3 on a 100 μm substrate 4, which consists of a 50 μm thick PE-layer 5 and a 50 μm thick PSA-layer 6. The substrate 4 with attached glass article 1 is placed on a rigid support 7. The first surface 2 of the glass article 1 is orientated upwards and impacted until breakage by a 4.5 g pen 8 with a ball-point made from tungsten carbide having a diameter of 300 μm. Step by step the drop height of the pen is increased until the glass article 1 breaks, wherein the sample is moved a little bit in order to avoid double or multiple hits. The pen drop test is performed on small samples of 20 mm×50 mm.

In addition, the impact resistance of chemically toughened and untoughened comparison and inventive working examples was tested with the ball drop test which was described in detail above. The ball drop test is performed on small samples of 50 mm×50 mm.

The breakage bending radius of chemically toughened and untoughened comparison and inventive working examples was tested with the 2 point bending method as describes above. The bending test is performed on small samples of 20 mm×70 mm.

The residue 3PB of chemically toughened and untoughened comparison and inventive working examples was tested as described above. The 3PB test is performed on small samples of 10 mm×10 mm.

Comparison Embodiment—Glass Types 1-4

Samples of different compositions and dimensions of 20 mm*50 mm, 20 mm*70 mm and 50 mm*50 mm and thicknesses of 0.07 mm, 0.1 mm, and 0.145 mm were produced as follows.

Samples of glass type 1-3 were produced in a down draw process to form ultrathin green glass articles. The samples of types 2 and 3 were then heat treated at 600-720° C. for 4-8 hours in a furnace. Because of the heat treatment β-quartz crystals (crystal phase) formed in the central part B (also called bulk) of the glass article 1 and there is still a 5 μm thick glass layer A, A' at both surfaces 1, 3 of the article. The glass layers A, A' have higher CTE than inner β-quartz layer (central part B), so there is stress being formed between A/B and A'/B interface.

Samples of glass type 4 were produced by an overflow process to form ultrathin green glass articles of 0.4 mm and were subsequently slimmed. Then the glass was irradiated, heated by laser (e.g., a 266 nm nano second laser) at 650-850° C. in the bulk (central part B) of the article. Because of the laser treatment β—Spodumene crystal formed in the central part B (bulk) and there was still glass layer A,A' at both surfaces 1, 3 of the article. The glass layers A, A' have higher CTE than the inner β—Spodumene layer (central part B), so there is stress being formed between A/B and A'/B interface.

Many samples of glass types 1-4 having the above mentioned dimensions and thicknesses were prepared, most of them were ceramized, and chemically toughened as given in table 2. After ion exchange, the toughened samples were cleaned and measured with FSM 6000 and SLP 1000.

30 toughened samples of each thickness and each DoL were tested and evaluated in respect of impact resistance using the pen drop test and ball drop test as described above. The average breakage height was calculated as described above, and the B10 height was calculated using Weibull method. Further, for determining a breakage bending radius 30 toughened samples of each thickness and DoL were tested in the 2 point bending method described above. The average breakage bending radius was calculated.

The crystal phase was measured by XRD and the crystal size was calculated by Scherrer's formula.

TABLE 2

Composition types 1-4, toughening conditions and results (comparison examples)

|  |  | Type 1 | Type 1 | Type 2 | Type 3 | Type 4 |
|---|---|---|---|---|---|---|
| Thickness/mm | | 0.07 | 0.1 | 0.1 | 0.1 | 0.145 |
| Heat treatment condition | Step 1 | | | 620° C. 1 h | 650° C 1 h | 655° C. 1 h |
| | Step 2 | | | 700° C. 1.5 h | 720° C 2 h | 730° C. 1.8 h |
| Crystal phase | | — | — | ß-quartz | ß-quartz | ß-quartz |
| Crystal size/nm | | | | 40 | 50 | 30 |
| Crystal homogeneous distribution in the bulk | | | | Yes | Yes | Yes |
| Vol. % of glass phase in glass-ceramic | | | | 30% | 20% | 45% |
| Chem. Toughening condition | Temp./° C. | 420 | 420 | 420 | 420 | 420 |
| | Time/h | 4 | 4 | 4 | 4 | 4 |
| | Salt bath | 100% $KNO_3$ | 100% $KNO_3$ | 100% $NaNO_3$ | 100% $NaNO_3$ | 100% $NaNO_3$ |
| CS/MPa | | 850 | 856 | 108 | 132 | 126 |
| DoL of K ion/μm | | 6.5 | 6.5 | 43 | 40 | 46 |
| Average pen drop height/mm | | 18 | 31 | 16 | 17 | 28 |
| B10 for pen drop/mm | | 12 | 22 | 11 | 10 | 17 |
| Average Breakage Bending radius/mm | | <15 | <25 | <45 | <45 | <55 |
| Average ball drop height/cm | | 15 | 23 | 14 | 18 | 25 |

Type 2-4 samples are typical glass-ceramic articles which are homogeneously ceramized throughout the whole volume, i.e., they have no gradient structure or layered structure between the outer surfaces 2, 3 and the central part B. There is no outer layer having a decreasing or increasing crystal proportion, but the material is homogenously crystallized, and there might be a very thin glassy zone on top of the glass-ceramic articles. Comparing the ceramized and toughened type 2-4 results with the not ceramized but toughened type 1 results it can be seen that the impact resistance (indicated by the average pen drop height and the ball drop height) and the bending performance (indicated by the average breakage bending radius) of the ceramized types are worse than those of the only toughened glass articles. Such known glass-ceramic articles do not have better impact performance than toughened glass of comparable thickness.

Embodiment 1—Glass Type 5

Green glass of type 5 composition has been melted at 1500° C. for 4 hours and casted and annealed at 620° C. The green glass is diced and polished to the size of 20*50*0.07 mm, 20*70*0.07 mm, 50*50*0.07 mm and 10*10*0.07 mm. After that, most samples were ceramized in a furnace at a temperature of about 1000° C. for about 40 to 90 min. Thereafter, the ceramized and not ceramized samples were chemically toughened in pure KNO3. After ion exchange, the toughened samples were cleaned and measured with FSM 6000.

Toughened samples of each thickness and crystal phase proportion were tested and evaluated in respect of impact resistance using the pen drop test and the ball drop test as described above. The average breakage height was calculated as described above, and the B10 height was calculated using Weibull method. Further, for determining a breakage bending radius toughened samples of each thickness and crystal phase proportion were tested in the 2 point bending method described above. The average breakage bending radius was calculated. In addition, the residue 3PB strength was measured as described above. In each test/experiment a plurality of 30 samples of each group were tested and evaluated.

The crystal phase was measured by XRD and the crystal size was calculated by Scherrer's formula.

TABLE 3

Composition type 5, ceramization and toughening conditions and results

|  |  | Ex. 1 | Ex. 2 | Ex. 3 | Ex. 4 |
|---|---|---|---|---|---|
| Thickness/mm | | 0.07 | 0.07 | 0.07 | 0.07 |
| Heat treatment condition | Temperature/° C. | | 1000 | 1000 | 1000 |
| | Time/min | | 40 | 70 | 90 |
| Crystal phase | | — | Leucite | Leucite | Leucite |
| Crystal size/nm | | | 20 | 32 | 45 |
| Crystal volume fraction at the surface | | | 10% | 17% | 24% |
| Crystal volume fraction at central part | | | 0% | 0% | 0% |
| Thickness of A + B + A/μm | | | 5/60/5 | 8/54/8 | 12/46/12 |
| Chemically toughening condition | Temperature/° C. | 420° C. | 420° C. | 420° C. | 420° C. |
| | Time/h | 4 | 4 | 4 | 4 |
| | Salt bath | | 100% KNO$_3$ | | |
| CS/MPa | | 345 | 338 | 326 | 309 |
| DoL of K ion/μm | | 9.3 | 9.1 | 8.8 | 8.3 |
| Average pen drop height/mm | | 21 | 28 | 35 | 41 |
| B10 for pen drop/mm | | 13 | 18 | 23 | 28 |
| Average breakage bending radius/mm | | <25 | <25 | <25 | <25 |
| Average ball drop height/cm | | 12 | 14 | 16 | 19 |
| Residue 3PB strength/MPa | | 87 | 178 | 201 | 242 |

Inventive examples 2 to 4 show a decreasing gradient glass-ceramic type (decreasing gradient structure): The proportion (also called "fraction") of crystal phase (here leucite) in the outer layers A, A' is 10, 17 or 24 vol. % and thus higher than in the central part B, where it is 0 vol. %.

Comparing the not ceramized but toughened embodiment (example 1) with the ceramized and toughened inventive embodiments (examples 2-4) it can be seen that chemically toughened gradient glass-ceramic articles have better pen drop heights, ball drop heights and residue 3PB strengths and thus show improved impact performance and better scratch resistance than toughened glass of the same composition and thickness.

Embodiment 2—Glass Type 6

Green glass of type 6 composition has been melted at 1450° C. for 6 hours and casted and annealed at 580° C. The green glass was diced and polished to the size of 20*70*0.1 mm, 20*50*0.1 mm, 50*50*0.1 mm and 10*10*0.1 mm. Most small pieces were pre-treated. They were immersed in a mix salt bath (390° C. for 2 to 6 h) for a first ion exchange between Na-ions and K-ions, which could establish a decreasing gradient of K-ions from the surface to a certain depth of glass sheets. The pre-treated green glass sheets were then heat treated in furnace at a temperature of about 1100° C.-1160° C. for about 60 min., wherein a nepheline crystal phase (NaAlSiO4) was formed due to the increasing gradient of Na-ions from the surface to a certain depth. The heat treating process forms an increasing gradient of crystal phase in the outer layers A, A'.

The glass samples and glass-ceramic samples were then toughened in pure KNO3 (second ion exchange, chemically toughening). After ion-exchange, the toughened samples were cleaned and measured with FSM 6000.

Toughened samples of each thickness and crystal phase proportion were tested and evaluated in respect of impact resistance using the pen drop test and ball drop test as described above. The average breakage height was calculated as described above, and the B10 height was calculated using Weibull method. Further, for determining a breakage bending radius toughened samples of each thickness and crystal phase proportion were tested in the 2 point bending method described above. The average breakage bending radius was calculated. In addition, the residue 3PB strength was measured as described above. In each test/experiment a plurality of 30 samples of each group were tested and evaluated.

The crystal phase was measured by XRD and the crystal size was calculated by Scherrer's formula.

In these embodiments the CTE in the range 20-300° C. was determined for the outer layers A, A' and the central part B. The CTE of the outer layers A, A' is 7.3 ppm/K, while that of the central part B is around 8.7 ppm/K. Therefore a compressive stress is established at the interface between A/B and A'/B.

TABLE 4

Composition type 6, ceramization and toughening conditions and results

|  |  | Ex. 5 | Ex. 6 | Ex. 7 | Ex. 8 |
|---|---|---|---|---|---|
| Thickness/mm | | 0.1 | 0.1 | 0.1 | 0.1 |
| Surface ion exchange to modify the surface composition | | | 50% KNO$_3$/ 50% NaNO$_3$ | 50% KNO$_3$/ 50% NaNO$_3$ | 50% KNO$_3$/ 50% NaNO$_3$ |
| Surface ion exchange condition | Temperature/° C. | | 390 | 390 | 390 |
| | Time/h | | 2 | 4 | 4 |
| | K depth/μm | | 10 | 20 | 20 |
| Heat treatment condition | Temperature/° C. | | 1100 | 1100 | 1160 |
| | Time/h | | 1 | 1 | 1 |
| Crystal phase | | — | nepheline | nepheline | nepheline |
| Crystal size/nm | | | 60 | 60 | 80 |
| Crystal volume fraction at the surface | | | 6% | 6% | 9% |
| Crystal volume fraction at central part | | | 40% | 40% | 55% |

TABLE 4-continued

Composition type 6, ceramization and toughening conditions and results

| | | | | | |
|---|---|---|---|---|---|
| Thickness of A + B + A/μm | | | 10/80/10 | 20/60/20 | 20/60/20 |
| Chemically toughening condition | Temperature/ °C. | 430 | | 430 | 430 |
| | Time/h | 2 | | 2 | 2 |
| | Salt bath | 100% KNO₃ | | 100% KNO₃ | |
| CS/MPa | | 538 | | 509 | 474 |
| DoL of K ion/μm | | 20 | | 18 | 16 |
| Average pen drop height/mm | | 26 | 32 | 46 | 53 |
| B10 for pen drop/mm | | 15 | 18 | 30 | 37 |
| Average breakage bending radius/mm | | <20 | <40 | <15 | <15 |
| Average ball drop height/cm | | 13 | 16 | 19 | 22 |
| Residue 3PB strength/MPa | | 93 | 87 | 459 | 514 |

| | | Ex. 9 | Ex. 10 | Ex. 11 |
|---|---|---|---|---|
| Thickness/mm | | 0.1 | 0.1 | 0.1 |
| Surface ion exchange to modify the surface composition | | 70% KNO₃/ 30% NaNO₃ | 70% KNO₃/ 30% NaNO₃ | 70% KNO₃/ 30% NaNO₃ |
| Surface ion exchange condition | Temperature/ °C. | 390 | 390 | 390 |
| | Time/h | 6 | 6 | 6 |
| K depth/μm | | 25 | 25 | 25 |
| Heat treatment condition | Temperature/ °C. | 1100 | 1100 | 1160 |
| | Time/h | 1 | 1 | 1 |
| Crystal phase | | nepheline | nepheline | nepheline |
| Crystal size/nm | | 60 | 60 | 80 |
| Crystal volume fraction at the surface | | 4% | 4% | 7% |
| Crystal volume fraction at central part | | 40% | 40% | 55% |
| Thickness of A + B + A/μm | | 25/50/25 | 25/50/25 | 25/50/25 |
| Chemically toughening condition | Temperature/ °C. | | 430 | 430 |
| | Time/h | | 2 | 2 |
| | Salt bath | | 100% KNO₃ | |
| CS/MPa | | | 410 | 386 |
| DoL of K ion/μm | | | 18 | 16 |
| Average pen drop height/mm | | 29 | 42 | 49 |
| B10 for pen drop/mm | | 16 | 27 | 31 |
| Average breakage bending radius/mm | | | <15 | <15 |
| Average ball drop height/cm | | 19 | 24 | 27 |
| Residue 3PB strength/MPa | | 88 | 403 | 457 |

Inventive examples 6-11 show an increasing gradient glass-ceramic type. The proportion (here called "fraction") of crystal phase (here nepheline) in the outer layers A, A' is 4-9 vol. % and thus smaller than that of the central part B (40-55 vol. %).

Examples having a gradient glass ceramic structure (examples 6-11) show an increase of pen drop height compared with toughened but not ceramized examples 5 of the same composition and thickness. The residue 3PB strength and thus the scratch resistance is increased by chemically toughening. The improvement of pen drop height and residue 3PB strength is much better when the glass-ceramic article is additionally chemically toughened (please see example 7 in comparison to example 6 or example 10 in comparison to example 9).

Embodiment 3—Glass Type 7

Green glass of type 7 composition has been melted at 1550° C. for 4 hours and casted and annealed at 500° C. The green glass was diced and polished to the size of 20*70*0.1 mm, 20*50*0.1 mm and 50*50*0.1 mm.

Prior to ceramization the green glass articles were exposured at 355 nm ns laser inducing at both surfaces with certain depth. The frequency was 100 Hz and power was 600-800 mW. The energy was 2 J/cm2. Then the exposed samples were heat treated in a furnace in two steps as shown in table 5.

The glass samples and glass-ceramic samples were then toughened in pure KNO3. After ion-exchange, the toughened samples were cleaned and measured with FSM 6000

Toughened samples of each thickness and crystal phase proportion were tested and evaluated in respect of impact resistance using the pen drop test as described above. The average breakage height was calculated as described above, and the B10 height was calculated using Weibull method. In each test/experiment a plurality of 30 samples of each group were tested and evaluated.

The crystal phase was measured by XRD and the crystal size was calculated by Scherrer's formula.

TABLE 5

Composition type 7, ceramization and toughening conditions and results

| | | Ex. 12 | Ex. 13 | Ex. 14 | Ex. 15 |
|---|---|---|---|---|---|
| Thickness/mm | | 0.1 | 0.1 | 0.1 | 0.1 |
| Heat treatment condition | Step 1 | | 500° C. 1 h | 500° C. 1 h | 500° C. 1 h |
| | Step 2 | | 560° C. 1 h | 560° C. 2 h | 560° C. 4 h |

TABLE 5-continued

Composition type 7, ceramization and toughening conditions and results

|  |  | Ex. 12 | Ex. 13 | Ex. 14 | Ex. 15 |
|---|---|---|---|---|---|
| Crystal phase | | — | $Li_2SiO_3$ | $Li_2SiO_3$ | $Li_2SiO_3$ |
| Crystal size/nm | | | 60 | 80 | 110 |
| Crystal volume fraction at the surface | | | 20% | 27% | 45% |
| Crystal volume fraction at central part | | | 0% | 0% | 0% |
| Thickness of A + B + A/μm | | | 20/60/20 | 28/44/28 | 40/20/40 |
| Chemically toughening condition | Temperature/°C. | 420 | 420 | 420 | 420 |
| | Time/h | 4 | 4 | 4 | 4 |
| | Salt bath | | 100% $KNO_3$ | | |
| CS/MPa | | 218 | 196 | 186 | 174 |
| DoL of K ion/μm | | 9.3 | 8.7 | 8.6 | 7.5 |
| Average pen drop height/mm | | 20 | 28 | 33 | 38 |
| B10 for pen drop/mm | | 12 | 18 | 21 | 26 |
| Average ball drop height/cm | | 13 | 17 | 20 | 23 |

Inventive examples 13-15 show a decreasing gradient glass-ceramic type. The proportion (here called "fraction") of crystal phase (here lithium silicate) in the outer layers A, A' is 20-45 vol. % and thus higher than that of the central part B which is amorphous here (0%).

Comparing the not ceramized but toughened embodiment (example 12) with the ceramized and toughened inventive embodiments (examples 13-15) it can be seen that gradient glass-ceramic article have greater pen drop heights and ball drop heights and thus show improved impact performance as toughened glass of the same thickness. In this glass-ceramic type the impact performance raises with increasing crystal phase proportion, increasing thickness of outer layers, increasing crystal size.

Embodiment 4—Glass Type 8

Many samples of green glass type 8 composition having a size of 20*70*0.145 mm, 20*50*0.145 mm, 50*50*0.145 mm and 10*10*0.145 mm were prepared, ceramized and chemically toughened. Different ceramization conditions were employed.

Most small green glass samples were pre-treated. The small pieces were first immersed in a pure $NaNO_3$ salt bath for ion exchange between Na-ions and Li-ions (390° C., 0.5-2 h), which could establish a decreasing gradient of Na-ions from the surface to a certain depth of glass sheets. Then the pre-treated green glass sheets were heat treated, which formed a Lithium disilicate crystal phase ($Li_2Si_2O_5$) due to the increasing gradient of Li-ions from the surface to a certain depth. The subsequent heat treating process formed an increasing gradient of crystal phase at this part. The results are displayed in Table 6 in details.

In example 17 of embodiment 4 the CTE in the range 20-300° C. was determined for the outer layers A, A' and the central part B. The CTE at the outer surfaces is 7.7 ppm/K, while that of the central part B is around 9.8 ppm/K. Therefore, a compressive stress is established at the interface between A/B and A'/B.

The glass samples and most glass-ceramic samples were then toughened in mixture salt bath 90% KNO3/10% $NaNO_3$. After ion-exchange, the toughened samples were cleaned and measured with FSM 6000 and SLP 1000.

Toughened samples of each thickness and crystal phase proportion were tested and evaluated in respect of impact resistance using the pen drop test as described above. The average breakage height was calculated as described above, and the B10 height was calculated using Weibull method. Further, for determining a breakage bending radius toughened samples of each thickness and crystal phase proportion were tested in the 2 point bending method described above. The average breakage bending radius was calculated. In addition, the residue 3PB strength was measured as described above. In each test/experiment a plurality of 30 samples of each group were tested and evaluated.

The crystal phase was measured by XRD and the crystal size was calculated by Scherrer's formula.

TABLE 6 composition type 8, ceramization and toughening conditions and results

|  |  | Ex. 16 | Ex. 17 | Ex. 18 | Ex. 19 |
|---|---|---|---|---|---|
| Thickness/mm | | 0.145 | 0.145 | 0.145 | 0.145 |
| Surface ion exchange to modify the surface composition | | | | 100% $NaNO_3$ | |
| Surface ion exchange condition | Temperature/°C. | | 390 | 390 | 390 |
| | Time/h | | 0.5 | 1 | 2 |
| | Na depth/μm | | 15 | 22 | 30 |
| Heat treatment condition | Temperature/°C. | | 800 | 800 | 840 |
| | Time/h | | 1 | 1 | 1 |
| Crystal phase | | — | $Li_2Si_2O_5$ | $Li_2Si_2O_5$ | $Li_2Si_2O_5$ |
| Crystal size/nm | | | 50 | 50 | 80 |
| Crystal volume fraction at the surface | | | 2% | 2% | 3% |
| Crystal volume fraction at central part | | | 43% | 43% | 51% |
| Thickness of A + B + A/μm | | | 17/111/17 | 25/95/25 | 34/77/34 |
| Chemically toughening condition | Temperature/°C. | 380 | 380 | 380 | 380 |
| | Time/h | 2 | 2 | 2 | 2 |
| | Salt bath | 90% $KNO_3$/10% $NaNO_3$ | | 90% $KNO_3$/10% $NaNO_3$ | |
| CS/MPa | | 838 | | 784 | 757 |
| DoL of K ion/μm | | 9.1 | | 8.9 | 8.5 |
| DoL of Na ion/μm | | 28 | | 34 | 42 |
| Average pen drop height/mm | | 54 | 45 | 67 | 73 |

TABLE 6-continued composition type 8, ceramization and toughening conditions and results

|  | Ex. 16 | Ex. 17 | Ex. 18 | Ex. 19 |
|---|---|---|---|---|
| B10 for pen drop/mm | 38 | 32 | 45 | 56 |
| Average breakage bending radius/mm | <25 | <50 | <25 | <25 |
| Average ball drop height/cm | 24 | 18 | 27 | 35 |
| Residue 3PB strength/MPa | 96 | 87 | 519 | 578 |

Inventive examples 17-19 show an increasing gradient glass-ceramic type. The proportion (here called "fraction") of crystal phase (here lithium disilicate) in the outer layers A, A' is 2-3 vol. % and thus smaller than that of the central part B (43-51 vol. %).

Chemically toughened inventive examples having a gradient glass ceramic structure (examples 18-19) show an increase of pen drop height, ball drop height and residue 3PB strength compared with toughened but not ceramized examples 16 of the same composition and thickness. An untoughened gradient glass ceramic article (example 17) does not seem to show improved features compared with only toughened glass (example 16) of the same composition and thickness. In this glass-ceramic type the improvement of impact resistance and residue 3PB strength is better when the glass-ceramic article is additionally chemically toughened (please see example 17 in comparison to example 18). Especially the residue 3PB strength is improved to a high extent for examples being both ceramized and toughened (examples 18, 19).

Embodiment 5—Glass Type 9

Many samples of green glass type 9 composition having a size of 20*70*0.145 mm, 20*50*0.145 mm, 50*50*0.145 mm and 10*10*0.145 mm were prepared, ceramized, and chemically toughened.

Most small green glass samples were pre-treated. The small pieces were first immersed in a pure $NaNO_3$ salt bath for ions exchange between Na and Li (390° C., 10-40 min), which can establish a decreasing gradient of Na-ions from the surface to certain depth of glass sheets. Then the pre-treated green glass sheets were heat treated, which can form a β-spodumene ($LiAlSi_2O_6$), $Li_2SiO_3$ crystal phase due to the increasing gradient of Li ion from the surface to certain depth. The heat treating process formed an increasing gradient of crystal phase at this part. The results are displayed in Table 7 in detail.

The glass samples and most glass-ceramic samples were then toughened in pure salt bath ($NaNO_3$). After ion-exchange, the toughened samples were cleaned and measured with FSM 6000 and SLP 1000.

Toughened samples of each thickness and crystal phase proportion were tested and evaluated in respect of impact resistance using the pen drop test as described above. The average breakage height was calculated as described above, and the B10 height was calculated using Weibull method. Further, for determining a breakage bending radius toughened samples of each thickness and crystal phase proportion were tested in the 2 point bending method described above. The average breakage bending radius was calculated. In addition, the residue 3PB strength was measured as described above. In each test/experiment a plurality of 30 samples of each group were tested and evaluated.

The crystal phase was measured by XRD and the size is calculated by Scherrer's formula.

TABLE 7 composition type 9, ceramization and toughening conditions and results

| | | Ex. 20 | Ex. 21 | Ex. 22 | Ex. 23 |
|---|---|---|---|---|---|
| Thickness/mm | | 0.145 | 0.145 | 0.145 | 0.145 |
| Surface ion exchange to modify the surface composition | | | 100% $NaNO_3$ | | |
| Surface ion exchange condition | Temperature/° C. | | 390 | 390 | 390 |
| | Time/min | | 10 | 20 | 40 |
| Na depth/μm | | | 10 | 14 | 20 |
| Heat treatment condition | Temperature/° C. | | 1000 | 1000 | 1000 |
| | Time/h | | 1 | 1 | 2 |
| Crystal phase | | — | β-spodumene($LiAlSi_2O_6$), $Li_2SiO_3$ | | |
| Crystal size/nm | | | 60 | 60 | 80 |
| Crystal volume fraction at the surface | | | 4% | 5% | 8% |
| Crystal volume fraction at central part | | | 30% | 30% | 45% |
| Thickness of A + B + A/μm | | | 13/119/13 | 18/109/18 | 26/93/26 |
| Chemically toughening condition | Temperature/° C. | 530 | | 530 | 530 |
| | Time/h | 0.5 | | 0.5 | 0.5 |
| | Salt bath | 100% $NaNO_3$ | | 100% $NaNO_3$ | |
| | CS/MPa | 154 | | 135 | 113 |
| | DoL of Na ion/μm | 20 | | 24 | 29 |

TABLE 7-continued composition type 9, ceramization and toughening conditions and results

|  | Ex. 20 | Ex. 21 | Ex. 22 | Ex. 23 |
|---|---|---|---|---|
| Average pen drop height/mm | 42 | 36 | 52 | 60 |
| B10 for pen drop/mm | 28 | 25 | 33 | 43 |
| Average breakage bending radius/mm | <25 | <50 | <25 | <25 |
| Average ball drop height/cm | 18 | 12 | 21 | 29 |
| Residue 3PB strength/MPa | 76 | 67 | 219 | 278 |

Inventive examples 21-23 show an increasing gradient glass-ceramic type. The proportion (here called "fraction") of crystal phase (here R-spodumene and lithium silicate) in the outer layers A, A' is 4-8 vol. % and thus smaller than that of the central part B (30-45 vol. %).

Toughened inventive examples having a gradient glass ceramic structure (examples 22-23) show an increase of pen drop height, ball drop height and residue 3PB strength compared with toughened but not ceramized examples 20 of the same composition and thickness. An untoughened gradient glass ceramic article (example 21) does not seem to show improved features compared with only toughened glass (example 20) of the same composition and thickness. In this glass-ceramic type the improvement of impact resistance and residue 3PB strength is better when the glass-ceramic article is additionally chemically toughened (please see example 22 in comparison to example 21). Especially the residue 3PB strength is improved to a high extent for examples being both ceramized and toughened (examples 22, 23).

Embodiment 6—Glass Type 10

Green glass of type 10 composition has been melted at 1600° C. for 8 hours and casted and annealed at 630° C. The green glass is diced and polished to the size of 20*70*0.25 mm, 20*50*0.25 and 50*50*0.25 mm with many pieces.

The green glass articles were heated by laser at 1000-1300° C. by using 266 nm ns laser inducing at both surfaces with certain depth (corresponding to outer layers A and A'). The induced areas forming a layer in each case having homogeneous crystal distribution wherein the crystals are imbedded inside an amorphous glass phase. The glass samples and glass-ceramic samples were then toughened in 90% $Li_2SO_4$+10% $K_2SO_4$. The CS and DoL was not able to be measured by either FSM 6000 or SLP 1000.

Toughened samples of each thickness and crystal phase proportion were tested and evaluated in respect of impact resistance using the ball drop test as described above. The average breakage height was calculated as described above. In each test/experiment a plurality of 30 samples of each group were tested and evaluated.

TABLE 8

Composition type 10, ceramization and toughening conditions and results

|  | Ex. 24 | Ex. 25 | Ex. 26 |
|---|---|---|---|
| Thickness/mm | 0.25 | 0.25 | 0.25 |
| Laser heat treatment |  | 1200° C. 2 h | 1200° C. 4 h |
| Crystal phase |  | $MgTi_2O_5$ | $MgTi_2O_5$ |
| Crystal size |  | 56 | 74 |
| A homogeneous crystal volume fraction from the surface to a depth of 30 μm |  | 28% | 37% |
| Crystal volume fraction at central part |  | 0% | 0% |
| Thickness of A + B + A'/μm |  | 30/190/30 | 30/190/30 |
| Chemically toughening condition | Temperature/° C. | 800 | 800 | 800 |
|  | Time/h | 4 | 4 | 4 |
|  | Salt bath | 90% $Li_2SO_4$ + 10% $K_2SO_4$ | | |
| Average ball drop height/cm | 43 | 57 | 60 |

Inventive examples 25 and 26 show a layered glass-ceramic type. The proportion (here called "fraction") of crystal phase (here $MgTi_2O_5$) in the outer layers A, A' is 28 to 37 vol. % while the central part is amorphous, i.e., consists of glass.

Toughened inventive examples having a layered glass ceramic structure (examples 25 and 26) show an increase of ball drop height compared with toughened but not ceramized examples 24 of the same composition and thickness. Thus, a layered glass-ceramic article has improved properties.

As can be seen from the explanations and experimental data above the invention provides a new ultrathin article having improve material properties. As far as impact resistance and scratch resistance are concerned, a glass-ceramic article having a gradient structure or a layered structure has improved properties compared with both known glass articles and known glass-ceramic articles of the same thickness, especially when the ultrathin glass-ceramic article is additionally chemically toughened in addition.

What is claimed is:

1. An ultrathin glass-ceramic article, comprising:
   a crystal phase and an amorphous phase;
   a thickness t of the article that is equal to or less than 0.3 mm;
   a first outer surface of the article;
   a central portion of the article;
   a first outer portion adjacent to the first outer surface and the central portion, the first outer portion having a thickness $t_1$ in a range of 5 to 40 μm;
   a gradient structure in the first outer portion,
   wherein the gradient structure is such that a crystal volume fraction decreases along the gradient structure from the first outer surface towards the central portion;
   a ratio $t_1/t$ that is greater than 0.007; and
   a coefficient of thermal expansion (CTE) difference between the first outer portion and the central portion, wherein the first outer portion has a CTE that is less than $13*10^{-6}$ in a temperature interval of 20° C. to 300° C.

2. The article of claim 1, wherein the crystal phase has a crystal volume fraction in the first outer portion that is in a range of 0.1 to 99 vol. %.

3. The article of claim 1, further comprising a glassy zone in which there are no crystals in the central portion.

4. The article of claim 1, further comprising a second outer surface and a second outer portion, the second outer surface being opposite to the first outer surface and the second outer portion being adjacent to the second outer surface and the central portion.

5. The article of claim 1, further comprising chemical toughening ions exchanged via an ion exchange process.

6. The article of claim 5, further comprising a compressive stress region extending from the first outer surface towards the central portion to a depth, wherein the compressive stress region has a surface compressive stress at the first outer surface of at least 100 MPa.

7. The article of claim 6, wherein the depth is greater than $0.01*t$, wherein t is in microns.

8. The article of claim 5, further comprising a pen drop breakage height that is higher than $t^2/800$ mm, wherein t is in microns.

9. The article of claim 5, further comprising a ball drop breakage height that is higher than $(t^2/600)*$mm, using a 20 g steel ball, wherein t is in microns.

10. The article of claim 5, further comprising a bending radius that is less than $900*t$ mm, wherein t is in millimeters.

11. The article of claim 1, wherein the article comprises a glass system selected from a group consisting of: a lithium-aluminate-silicate (LAS), magnesium-aluminate-silicate (MAS), zinc-aluminate-silicate (ZAS), sodium-aluminate-silicate (NAS), and lithium-disilicate (LDS).

12. The article of claim 1, further comprising a compressive stress on the first outer portion that extends into the central portion due to the CTE difference.

13. The article of claim 1, wherein the central portion has a CTE that is greater than $1*10^{-6}$ in the temperature interval of 20° C. to 300° C.

14. The article of claim 1, wherein the crystal volume fraction in the gradient structure varies by 3% per µm.

15. The article of claim 1, further comprising a ratio $t_1/t$ that is greater than 0.01.

16. The article of claim 1, further comprising a ratio $t_1/t$ that is greater than 0.02.

17. The article of claim 1, wherein the first outer portion has a thickness $t_1$ in a range of 5 to 20 µm.

18. The article of claim 1, further comprising a ratio $t_1/t$ that is greater than 0.02.

\* \* \* \* \*